Aug. 24, 1943.  D. ASHBY  2,327,386
APPARATUS FOR ELECTRODEPOSITION
Filed Feb. 28, 1942
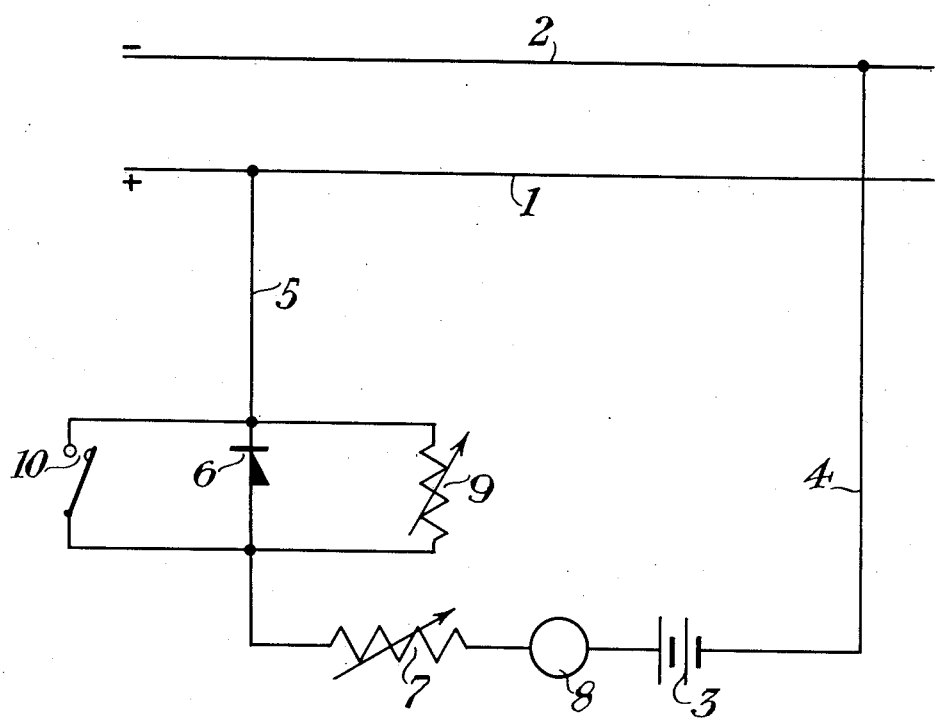
INVENTOR
Donald Ashby.
BY
HIS ATTORNEY Patented Aug. 24, 1943

2,327,386

UNITED STATES PATENT OFFICE 2,327,386

APPARATUS FOR ELECTRODEPOSITION

Donald Ashby, London, England, assignor, by mesne assignments, to The Union Switch & Signal Company, Swissvale, Pa., a corporation of Pennsylvania Application February 28, 1942, Serial No. 432,731
In Great Britain December 5, 1940

1 Claim. (Cl. 171—97)

This invention relates to apparatus for electro-deposition or other apparatus requiring an uninterrupted current supply, of the kind in which the direct electric current required for operation is derived from an alternating current supply circuit through a static rectifier of the dry surface contact or other suitable type.

In apparatus of this character, particularly for certain processes of electro-deposition, a failure in the supply of operating current to the electrodes of the bath in which the deposition is effected causes immediate damage to the work. In installations in which the direct current is arranged to be supplied from a rotary converter or motor generator operated from the alternating current supply circuit, the failure of the current supply to the converter or motor generator from the supply circuit may be arranged to cause a battery to be connected to the electrodes as an alternative source of supply, the supply of direct current to the electrodes during the change-over being maintained by the converter or motor generator due to the kinetic energy of the rotor of the machine.

The maintenance of the current supply to the bath electrodes in this manner is, however, evidently not possible in installations in which the supply of direct current to the electrodes is effected through a static rectifier and the present invention has for its object to provide arrangements for preventing in such installations even a temporary failure of the direct current supply to the electrodes in the event of failure of the supply of alternating current to the rectifier.

According to the present invention a suitable storage battery is connected in series with a half-wave rectifier across the electrode terminals of the bath connected to the main rectifier in such a manner that so long as the alternating current supply to the main rectifier is maintained the battery is trickle-charged through the half-wave rectifier in its reverse direction. In the event, however, of failure of the alternating current supply to the main rectifier, the battery will operate to supply current to the electrodes by discharge through the half-wave rectifier in its forward direction.

The invention is illustrated by way of example in the accompanying drawing which is a diagrammatic view of a circuit arrangement embodying one form of the invention.

Referring now to the drawing the main bus bars or circuit conductors connecting the main rectifier to the bath electrodes are indicated at 1, 2, the main rectifier (not shown) being of any suitable polyphase type or being provided with suitable smoothing arrangements for preventing the voltage across the bus bars 1, 2 from falling to a value below that of the battery voltage during any part of the alternating current cycle.

The storage battery 3 constituting the alternative source of supply is connected to the bus bars 1, 2 by conductors 4, 5 in series with a half-wave rectifier 6, a limiting resistance 7 and an ammeter 8 of the central zero type. An adjustable resistance 9 and a charge switch 10 are connected in parallel with the rectifier 6, the operation of the apparatus being as follows:

Under normal conditions the battery 3 being substantially fully charged and connected as shown in the drawing, the electrodes of the plating bath are supplied with operating current from the bus bars 1, 2 at a suitable voltage for example 8 volts. The charge switch 10 is open and the battery 3 which is of considerably lower voltage (for example 4 volts) is under these conditions maintained in a full state of charge by a trickle charging current flowing from the bus bar 1 through conductor 5, the rectifier 6 in its reverse direction, resistance 7, ammeter 8, battery 3 and conductor 4 to the bus bar 2. This charging current is maintained at the desired suitable value by adjustment of the resistance 9 connected in parallel with the rectifier 6.

In the event of the supply of current to the bus bars 1, 2 failing for any reason, the battery 3 will discharge to the bus bars through the rectifier 6 in its forward direction and the limiting resistance 7 which is adjustable.

When the supply of current to the bus bars 1, 2 is restored, the battery 3 may be recharged from the bus bars by closing the switch 10 and adjusting the charging current supply to the battery during this recharging operation. The battery 3 will evidently discharge to the bus bars at a somewhat higher rate than if the switch 10 were open but this action does not involve any serious disadvantage.

The invention evidently does not involve the provision of any relay or other devices having moving parts while preventing in a simple and effective manner even an instantaneous failure of supply of direct current to the electrodes of the bath or other load devices in the event of failure of the alternating current supply.

Having now described my invention, what I claim as new and desire to secure by Letters Patent is:

Apparatus for supplying unidirectional current to a load without interruption upon failure or energy in the main supply conductors comprising, in combination with said main supply conductors, a reserve storage battery connected across said conductors in a direction to continue the supply of current of the same polarity as supplied from said conductors to the load, an asymmetric unit connected between a terminal of said battery and one of said main conductors, said asymmetric unit being poled in a direction such that current flowing from said battery to said conductors encounters the low resistance of said unit but current flowing from the conductors to the battery encounters the high resistance of said unit, whereby normally said battery will receive charging current through the high resistance of said unit and will maintain without interruption the supply of current to the load through the low resistance of said unit upon failure of energy in said main supply conductors, and an adjustable shunt connected around said asymmetric unit for regulating the charging rate of said battery.

DONALD ASHBY.